United States Patent [19]
Chary

[11] Patent Number: 5,182,960
[45] Date of Patent: Feb. 2, 1993

[54] BEVEL GEAR DRIVE ARRANGEMENT

[75] Inventor: Henry H. Chary, Rancho Palos Verdes, Calif.

[73] Assignee: Allied-Signal Inc., Morris Township, Morris County, N.J.

[21] Appl. No.: 804,561

[22] Filed: Dec. 10, 1991

[51] Int. Cl.$^5$ ............................................. F16H 1/14
[52] U.S. Cl. ........................................ 74/417; 74/423
[58] Field of Search ................ 74/410, 417, 423, 440, 74/395, 400

[56] References Cited

U.S. PATENT DOCUMENTS

| | | | |
|---|---|---|---|
| 1,328,670 | 1/1920 | Head | 74/423 |
| 3,022,675 | 2/1962 | Trought | 74/417 X |
| 4,719,813 | 1/1988 | Chalik | 74/417 X |
| 4,742,725 | 5/1988 | Nagai | 74/417 X |

FOREIGN PATENT DOCUMENTS 1200046 12/1985 U.S.S.R. ............................... 74/417

Primary Examiner—Leslie A. Braun
Assistant Examiner—David W. Laub
Attorney, Agent, or Firm—Robert A. Walsh

[57] ABSTRACT

A gear arrangement includes two coaxial output bevel gears having a common pitch axis and rigidly coupled each to the other. Two coaxial bevel pinions, each of which meshes with a corresponding output bevel gear, are flexibly coupled together via a quill shaft. The quill shaft is used to adjust the preload of one of the pinions against the other, whereby the load capacity of the gear drive is substantially equal to the sum of the load capacity of the two pinion/gear pairs.

10 Claims, 2 Drawing Sheets

BEVEL GEAR DRIVE ARRANGEMENT

BACKGROUND OF THE INVENTION

The object of this invention is to extend the load capacity of a pair of mating bevel gears.

The load carrying capacity of mating bevel gears, i.e. a pinion and an output gear, depends on a number of variables, among which is the face width of the gear teeth. Due to manufacturing constraints this face width is limited to a particular percentage of gear cone distance. The present invention avoids the problems due to this limitation by nesting a secondary pinion within a primary pinion, whereby the secondary pinion shares part of the gear load.

An arrangement of the type described is useful on applications where momentary load spikes have to be carried by the pair of mating bevel gears. Moreover, this arrangement is particularly useful in applications where weight is critical and where backlash between gears cannot be tolerated.

SUMMARY OF THE INVENTION

This invention contemplates a bevel gear drive arrangement including a pair of coaxial (primary and secondary) pinions and a pair of coaxial (primary and secondary) output gears. The primary pinion is in mating engagement with the primary output gear and the secondary pinion is in mating engagement with the secondary output gear. The pinions are sized to share a common pitch angle, with the diametral pitch at the heel of the secondary pinion being substantially the same as the diametral pitch at the toe of the primary pinion.

The same relative sizing applies to the output gears. However, whereas the primary and secondary output gears are timed and rigidly coupled to each other, the primary and secondary pinions are flexibly coupled via a quill shaft which is integral with the secondary pinion.

The quill shaft is used to preload the secondary pinion against the primary pinion to establish the relative loads that the pinions will carry, based on the relative load carrying capacity of both pinions. A torquing force is applied to a vernier coupling between the quill shaft and the primary pinion for establishing the required secondary pinion preloads.

Accordingly, this invention contemplates a bevel gear drive arrangement comprising: a first bevel pinion; a second bevel pinion; said first and second pinions being coaxially disposed; a first bevel output gear in meshing engagement with the first bevel pinion; a second bevel output gear in meshing engagement with the second bevel pinion; said first and second bevel output gears being coaxially disposed and rigidly coupled each to the other; a quill shaft for flexibly coupling the first and second pinions each to the other; and means for applying a torquing force to the quill shaft for preloading one of the first and second bevel pinions against the other of the first and second bevel pinions so that the load capacity of the gear drive arrangement is substantially equal to the sum of the load capacities of a first gear pair including the first pinion and the first output gear and a second gear pair including the second pinion and the second output gear.

DETAILED DESCRIPTION OF THE INVENTION

Figure 1:
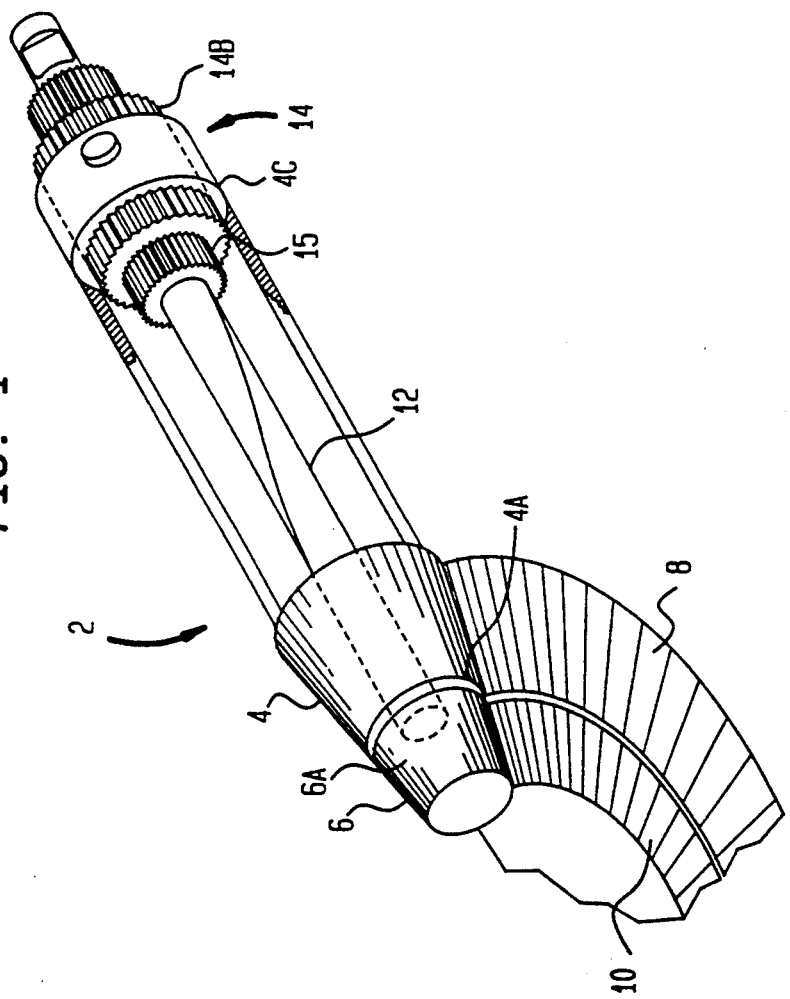
FIG. 1 is a perspective representation illustrating the several components of the invention.

With reference to the drawings, a bevel gear drive is designated by the numeral 2. Gear drive 2 includes a primary bevel pinion 4 and a secondary bevel pinion 6. Pinions 4 and 6 are in coaxial arrangement. Pinion 4 is in mating engagement with a primary bevel output gear 8 and pinion 6 is in mating engagement with a secondary bevel output gear 10. Gears 8 and 10 are in coaxial arrangement.

The sizing of pinions 4 and 6 is such that they share the same pitch angle. That is to say, the diametral pitch at the heel 6A of secondary pinion 6 is substantially the same as the diametral pitch at the toe 4A of primary pinion 4.

The same relative sizing applies to output gears 8 and 10. However, whereas output gears 8 and 10 are rigidly fixed to each other, pinions 4 and 6 are flexibly coupled to each other by a quill shaft 12. Quill shaft 12 is integral at one end thereof with secondary pinion 6.

It will be appreciated that quill shaft 12 has a dual purpose. The quill shaft is adjustable to preload secondary pinion 6 against primary pinion 4 to establish the relative loads the pinions will carry based on the relative load capacity of the two pinions. This arrangement also reduces meshing load spikes caused by inaccuracies in the four gears, i.e. the two pinions and the two output gears, and by their relative indexing errors due to manufacturing and assembly.

With particular reference to FIG. 1, a vernier coupling 14 has an internal spline (hidden from view) which mates with an external spline 15 on the free end of quill shaft 12, i.e. the end of the shaft opposite the end thereof integral with secondary pinion 6. Coupling 14 has an external spline 14B which is in meshing engagement with a spline (hidden from view) internal a barrel 4C of primary pinion 4.

The internal and external splines of coupling 14 have a different number of teeth. This permits fine angular adjustments between the primary and secondary pinions to vary the preload of the secondary pinion against the primary pinion.

Figure 2:
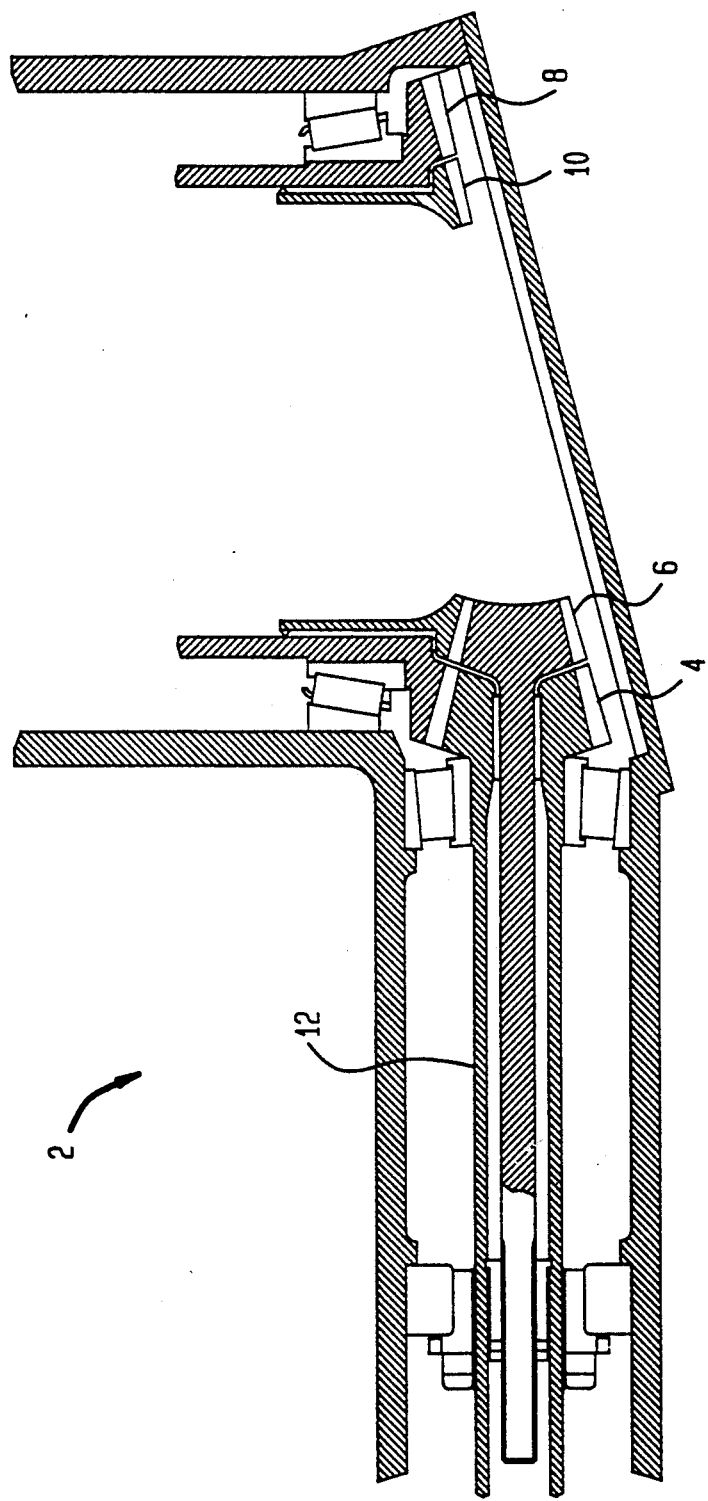
FIG. 2 is a diagrammatic representation particularly illustrating the interaction of the several components of the invention.

Thus, in summary, the arrangement shown in FIGS. 1 and 2 features a pair of output bevel gears 8 and 10 having a common pitch axis, and which gears 8 and 10 are rigidly coupled each to the other. A mating pair of beveled pinions 4 and 6 having a common axis are flexibly coupled each to the other via quill shaft 12. A torque is applied to quill shaft 12 via vernier coupling 14 which preloads pinion 6 against pinion 4 to effectively increase the load capacity of gear drive 2 to virtually the sum of the two pinion/output gear pairs.

Pinions 4 and 6 are arranged with pinion 6 coupled to quill shaft 12 to take up the initial torque which is then shared with pinion 4. A load ratio is determined by the relative capacity of pinions 4 and 6. The spring rate of quill shaft 12 and the backlash of pinion 4 are arranged so that pinion 6 does not take on an undue share of an applied load.

Although applicable to conventional right angle gear drives, i.e. straight bevel, zerol or spiral bevel gear drives, the arrangement is best based on the latter to achieve maximum load capacity as illustrated in FIG. 2.

With the above description of the invention in mind, reference is made to the claims appended hereto for a definition of the scope of the invention.

What is claimed is:

1. A bevel gear drive arrangement, comprising:
   a first bevel pinion;
   a second bevel pinion;
   said first and second pinions being coaxially disposed and arranged so that the diametral pitch at the heel of the second pinion is equal to the diametral pitch at the toe of the first pinion;
   a first bevel output gear in meshing engagement with the first pinion;
   a second bevel output gear in meshing engagement with a second pinion;
   said first and second output gears being coaxially disposed and rigidly coupled each to the other;
   means for flexibly coupling the first and second pinions each to the other, said means includes
   a quill shaft integral at one end thereof with the second pinion; and
   the quill shaft is responsive to the applied torquing force for preloading the second pinion against the first pinion; and
   means for applying a torquing force to the coupling means for preloading one of the first and second pinions against the other of the first and second pinions so that the load capacity of the gear drive arrangement is substantially equal to the sum of the load capacities of a first gear pair including the first pinion and the first output gear and a second gear pair including the second pinion and the second output gear.

2. A bevel gear drive arrangement as described by claim 1, wherein:
   a vernier coupling is arranged between the end of the quill shaft opposite the one end thereof and the first pinion for applying the torquing force to said quill shaft for preloading the second pinion against the first pinion.

3. A bevel gear drive arrangement as described by claim 2, including:
   means arranged with the vernier coupling and the opposite end of the quill shaft for engaging said coupling with said shaft; and
   means arranged with the vernier coupling and the first pinion for engaging said coupling and said first pinion.

4. A bevel gear drive arrangement as described by claim 11, wherein:
   the means arranged with the vernier coupling and the opposite end of the quill shaft includes the coupling having an internal spline and the opposite end of the quill shaft having an external spline, with said internal and external splines being in meshing engagement; and
   the means arranged with the vernier coupling and the first pinion includes the coupling having an external spline and the first pinion having a barrel, said barrel having an internal spline, with said external and internal splines being in meshing engagement.

5. A bevel gear drive arrangement as described by claim 4, wherein:
   the internal and external splines of the coupling having a different number of teeth for permitting fine angular adjustment between the first and second pinions to vary the preload of the secondary pinion against the first pinion.

6. A bevel gear drive arrangement, comprising:
   a first bevel pinion;
   a second bevel pinion;
   said first and second pinions arranged to converge toward a common axis, with the diametral pitch at the heel of the second pinion being substantially equal to the diametral pitch at the toe of the first pinion;
   a first bevel output gear in meshing engagement with the first pinion;
   a second output gear in meshing engagement with the second pinion;
   said first and second bevel output gears being coaxially disposed and rigidly coupled each to the other;
   means for flexibly coupling the first and second pinions each to the other said means includes a quill shaft integral at the one end thereof with the second pinion; and
   the quill shaft is responsive to the applied torquing force for preloading the second pinion against the first pinion; and
   means for applying a torquing force to the coupling means for preloading one of the first and second pinions against the other of the first and second pinions so that the load capacity of the gear drive arrangement is substantially equal to the sum of the load capacities of a first gear pair including the first pinion and the first output gear and a second gear pair including the second pinion and the second output gear.

7. A bevel gear drive arrangement as described by claim 6, wherein:
   a vernier coupling is arranged between the end of the quill shaft opposite the one end thereof and the first pinion for applying the torquing force to said quill shaft for preloading the second pinion against the first pinion.

8. A bevel gear drive arrangement as described by claim 7, including:
   means arranged with the vernier coupling and the opposite end of the quill shaft for engaging said coupling with said shaft; and
   means arranged with the vernier coupling and the first pinion for engaging said coupling and said first pinion.

9. A bevel gear drive arrangement as described by claim 8, wherein:
   the means arranged with the vernier coupling and the opposite end of the quill shaft includes the coupling having an internal spline and the opposite end of the quill shaft having an external spline, with said internal and external splines being in meshing engagement; and
   the means arranged with the vernier coupling and the first pinion includes the coupling having an external spline and the first pinion having a barrel, said barrel having an internal spline, with said external and internal splines being in meshing engagement.

10. A bevel gear drive arrangement as described by claim 9, wherein:
    the internal and external splines of the coupling having a different number of teeth for permitting fine angular adjustment between the first and second pinions to vary the preload of the secondary pinion against the first pinion.

* * * * *